Dec. 15, 1970 D. C. BERKEY 3,546,882
GAS TURBINE ENGINES
Original Filed April 27, 1966 2 Sheets-Sheet 1
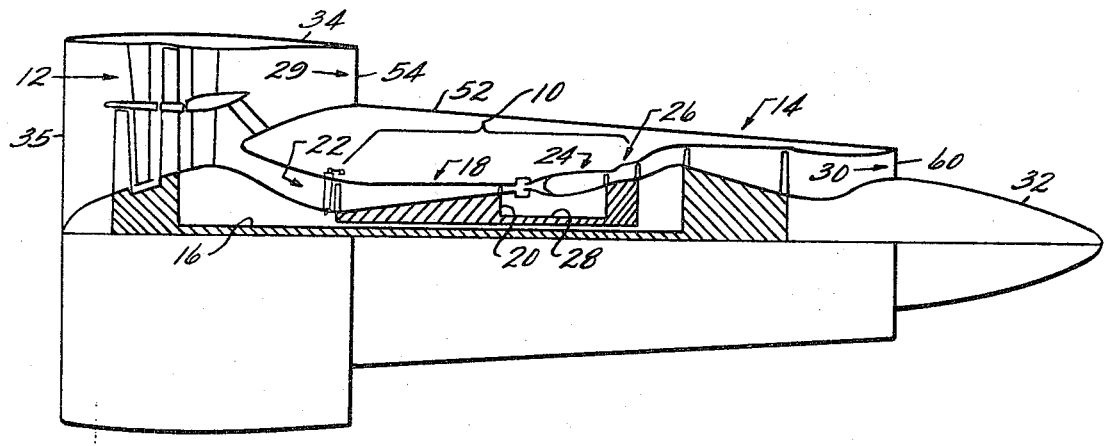
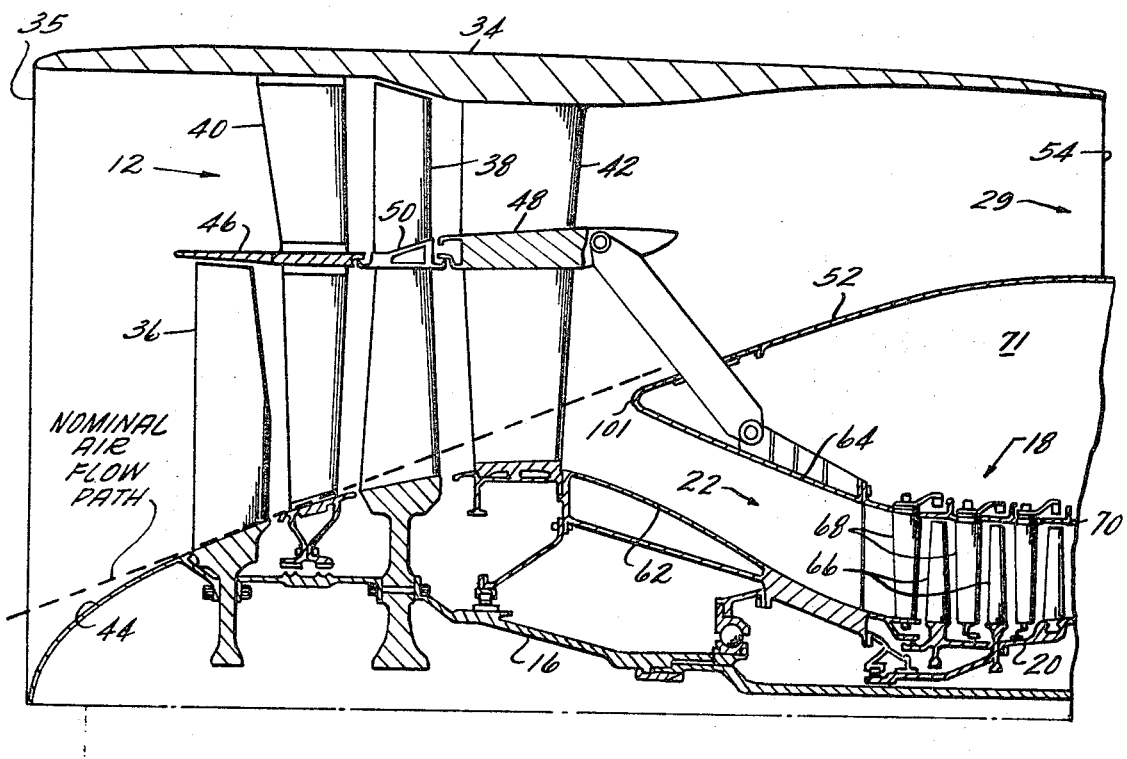
INVENTOR.
DONALD C. BERKEY Dec. 15, 1970 D. C. BERKEY 3,546,882
GAS TURBINE ENGINES
Original Filed April 27, 1966 2 Sheets-Sheet 2
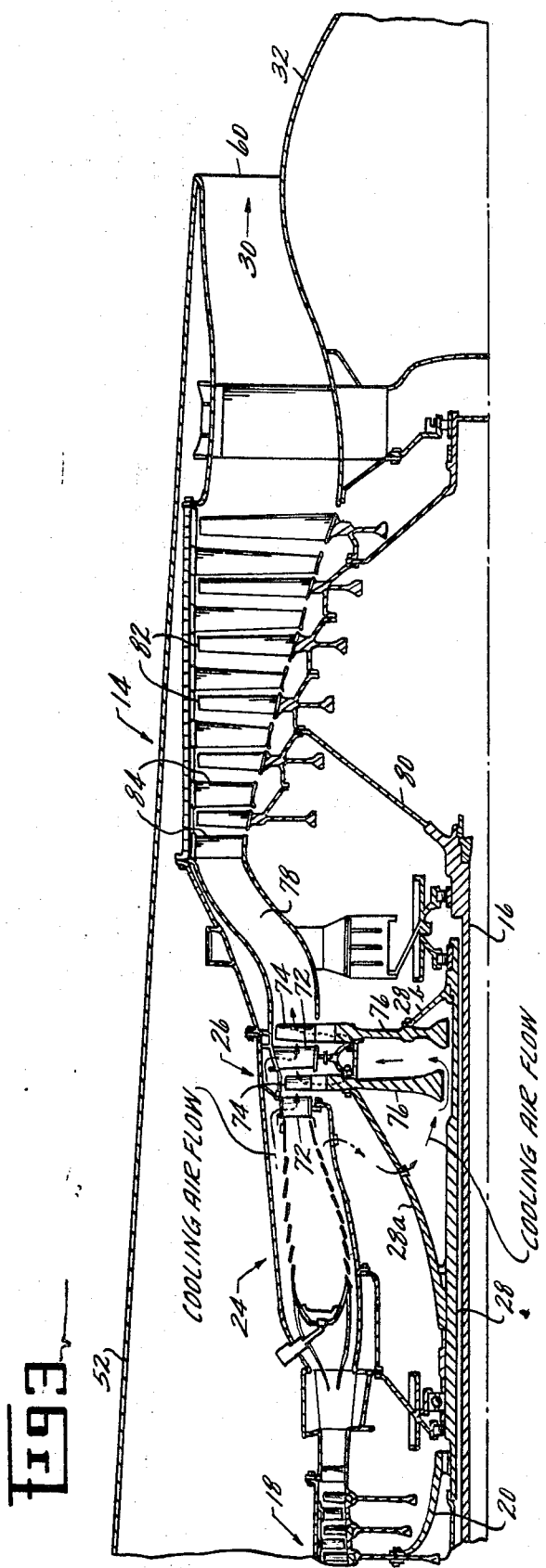
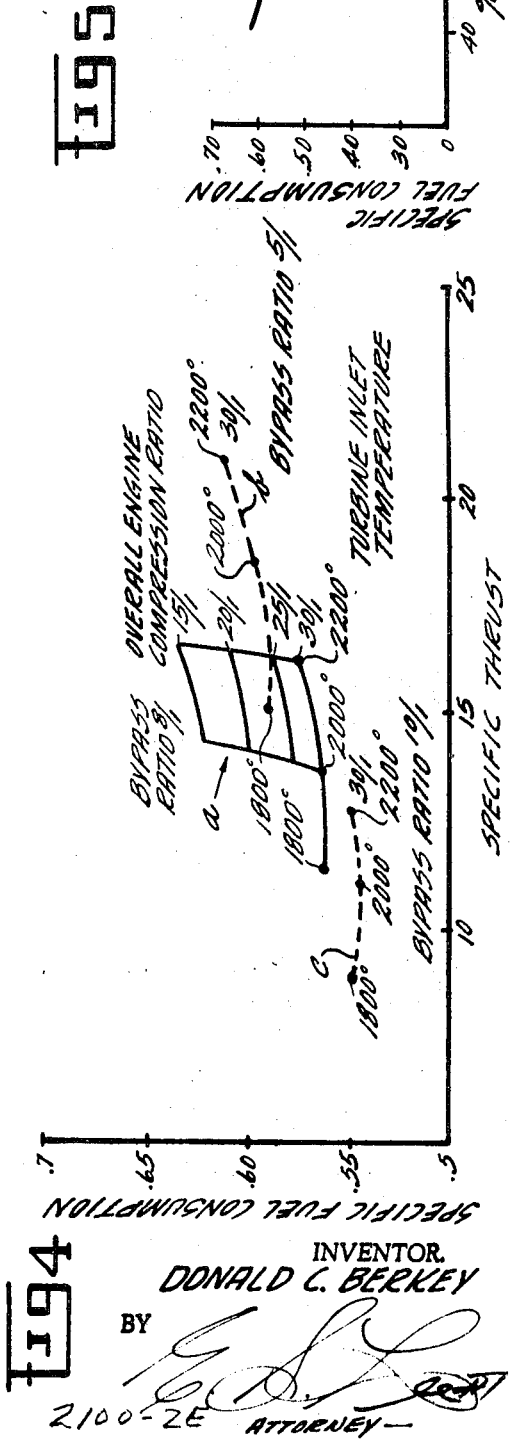
INVENTOR.
DONALD C. BERKEY
BY
ATTORNEY United States Patent Office 3,546,882
Patented Dec. 15, 1970

3,546,882
GAS TURBINE ENGINES
Donald C. Berkey, Cincinnati, Ohio, assignor to General Electric Company, a corporation of New York
Continuation of application Ser. No. 547,090, Apr. 27, 1966. This application Apr. 24, 1968, Ser. No. 725,222
Int. Cl. B63h 11/00
U.S. Cl. 60—204                                    11 Claims

ABSTRACT OF THE DISCLOSURE

The disclosure shows a turbofan engine of a preferred configuration having an altitude between 30,000 and 45,000 feet, and a flight speed between Mach .75 and .95, a bypass ratio between 5/1 and 10/1 with an overall engine compression ratio greater than 20/1 and a turbine inlet temperature of at least 2,000° F.

---

This is a continuation of application Ser. No. 547,090, filed Apr. 27, 1966, now abandoned.

The present invention relates to improvements in gas turbine engines and more particularly turbofan engines used for the propulsion of aircraft.

Gas turbine engines, when first used for the propulsion of aircraft, were of the turbojet type, wherein the propulsive force was derived solely from a high velocity, high temperature gas stream, discharged through an exit nozzle. This "first generation" of aircraft gas turbine engines provided many advantages in increasing the speed capability of aircraft. Aircraft employing such pure jet engines, however, had a limited range or load capacity due to the high specific fuel consumption rates of the engines, this term being defined as the pounds of fuel per hour required to produce a pound of thrust.

A significant reduction in specific fuel consumption was provided by what is generally regarded as the "second generation" of gas turbine aircraft engines which are referred to as turbofan engines. In such engines a portion of the energy developed by a turbojet engine is utilized to drive a "fan" which then discharges air through a nozzle so that the propulsive force for the engine is provided, both from the fan nozzle and the nozzle from which the hot gases from the turbojet portion of the engine are discharged. This "second generation" of gas turbine engines was so recognized because of its achievement of a specific fuel consumption reduction of approximately 15% in subsonic flight.

The present invention, in its broader aspects, has for its object to provide a "third generation" of gas turbine engines, also of the turbofan type, which substantially advance their capabilities for the propulsion of aircraft, primarily by the reduction of specific fuel consumption.

Another object of the invention is to attain this broad end and in so doing, provide engines which are light in weight, simple and economical to build and reliable in operation.

Stated another way, the object of the invention is to substantially increase the range and/or load carrying capabilities of aircraft.

The above ends are attained by the provision of a turbofan engine which comprises a core engine having an axial flow compressor. A combustor downstream of the compressor receives pressurized air therefrom which supports combustion and provides a hot gas stream. This hot gas stream is then employed to drive a turbine which is connected by a shaft to the compressor rotor to provide the necessary energy for pressurizing air in the compressor. The overall engine compression ratio, i.e., the pressure of air discharged from the compressor to the pressure of air entering the engine, is preferably at least greater than 20/1.

A second turbine is driven by this same hot gas stream. A fan rotating within an annular duct is connected to and rotated by the second turbine at the same rate as the second turbine. The hot gas stream and the fan air are discharged through nozzle means to provide a propulsive force. The bypass ratio of the mass of air discharged by the fan into the nozzle means to the mass of air entering the core engine is between 5 and 10/1, which parameter in combination with the pressure ratio of 20/1 or greater has been found highly effective in reducing specific fuel consumption.

While the relationship of the mass of air discharged by the fan nozzle and the mass of air entering the core engine has and will hereinafter be presented as fractional ratios, it will be understood that such ratios may be expressed in terms of a percent. For example, it will be understood that a bypass ratio of 5/1 indicates that for every 6 parts of air, 1 part enters the core and 5 parts, 5/6 or approximately 83% of the air is exhausted through the fan nozzle. Similarly, it will be understood that a bypass ratio of 10/1 indicates that for every 11 parts of air, 1 part enters the core and 10 parts, 10/11 or approximately 93% is exhausted through the fan nozzle.

Other features of the invention are found in the preferred temperature of the gas stream leaving the combustor and entering the first turbine being maintained at 2000° F. or greater. Operation above this minimum temperature has been found to minimize the size and weight of an engine for a given thrust level with little or no increase in specific fuel consumption. The lighter weight and reduced aerodynamic drag of a smaller engine in turn result in lower rates of fuel consumption in propulsion of an aircraft. Use of such temperatures is preferably maintained in combination with the provision of means for air cooling the turbine itself. To this end cooling air may be derived from the compressor without any substantial increases in specific fuel consumption.

These operating parameters, it will be noted, are referenced to a given cruise altitude and speed.

Further advantages of these operating parameters are best utilized in combination with certain constructional features of the engine which include the use of a specific type of fan, a preferred form of fan nozzle, and the relative sizes of the rotating components of the invention.

The above and other objects and features of the invention will be apparent from a reading of the following description of the disclosure found in the accompanying drawings and the novelty thereof pointed out in the appended claims.

In the drawings:

FIG. 1 is a schematic representation of an engine;

FIG. 2 is a longitudinal half section of the forward portion of an engine;

FIG. 3 is a longitudinal half section of aft portions of the engine;

FIG. 4 is a plot of engine operating parameters; and

FIG. 5 is a plot illustrating certain benefits derived from the use of such engine parameters.

Referring first to FIG. 1, an engine 10 embodying the present invention is diagrammatically shown. This engine may be considered as comprising a core engine 10, a fan 12, and a fan turbine 14 which are interconnected by a shaft 16. The basic elements as thus described are known to the art and function as follows.

The core engine includes an axial flow compressor 18 having a rotor 20. Air entering inlet 22 is compressed and then discharged to a combustor 24 where fuel is burned to provide high energy combustion gases which drive a turbine 26. The turbine 26 in turn drives rotor 20 through shaft 28 in the usual manner of a gas turbine engine. The gases of combustion then pass to and drive the fan turbine 14 which in turn drives the fan 12. A propulsive force is thus obtained by the action of fan 12 discharging air through a convergent fan nozzle 29 and by the discharge of combustion gases from a core engine or primary nozzle 30 defined in part by a plug 32.

Reference is now made to FIG. 2 for a more detailed description of the preferred configuration of the fan 12 and forward portion of the compressor 18. Reference to "fan" in turbofan engines defines, in essence, a shrouded multibladed propeller usually functioning as a low pressure compressor for discharge of air from a nozzle. Thus, the fan 12 comprises a shroud or open ended duct 34 having an inlet at 35 which is also the overall engine inlet. A plurality of rotor blades 36, 38 are arranged in two axially spaced stages and connected to the shaft 16 which, as can be seen from FIG. 2, is preferably tubular. Two stages of stator blades 40, 42 are provided immediately downstream of the rotor blades 36, 38, respectively. A bullet-shaped nose 44, in combination with circumferential extensions or platforms on the rotor and rotor blades, defines the inner surface of the air flow path through the fan 12. The outer surface of this flow path is defined by the shroud 34. It is also preferred that the flow path through the fan be divided into inner and outer portions by circumferential extensions 46, 48, 50 respectively extending from the stator blades 40, 42 and rotor blades 38. The rotor blades 36 project only into the inner flow path portion and are shrouded by the circumferential extension 46.

The fan 12 functions as a high volume low pressure compressor. Discharge therefrom serves two purposes. First it supplies air to the core gas generator 10 and second it provides a propulsive air stream. In connection with the latter function it will be noted that a rearward extension of the shroud 34 and the forward portion of a pod-like nacelle 52 which is divergently angled outwardly or increases in diameter from the inlet 22 to the downstream end of the duct or shroud 34 so as to form a convergent nozzle which terminates in a throat 54 at the plane of the rear end of the shroud 34. It will also be noted that the shroud 34 is convergently angled inwardly (preferably at an angle of 5–7%) marginally of the throat 54. Furthermore, the nacelle 52 (FIGS. 1 and 3) is preferably convergently tapered downstream of the throat 54 on approximately the same angle to its rear end which then defines the throat of the primary nozzle 30 as indicated at 60.

A portion of the air discharged from fan 12 is directed to the core engine 10 through inlet 22 which is defined by an annular frame member 62 (FIG. 2) and an inner extension 64 of the nacelle 52. The nominal air flow path (indicated by dotted lines in FIG. 2) through the fan 12 passes over the entrance to the inlet 22. This factor plus the centrifugal action of the fan rotor is highly effective in minimizing, if not eliminating ingestion of dirt or other foreign objects into the core engine 10.

While the nominal air flow path is as described, prepressurized or supercharged air enters the axial flow compressor 18. This compressor is preferably of the so-called "variable geometry" type comprising a plurality of rotor blades 66 mounted on the hollow rotor 20 and stator blades 68 mounted on a casing 70. Means (not shown) are provided for pivoting the stator blades (of at least the initial stages) about axes from the rotor axis. This enables the compressor 18 to provide a high compression ratio and yet operate effectively during acceleration and deceleration.

It will be noted that the nacelle 52 and the various casings for the core engine 10 are spaced apart to define an annular chamber 71 in which various controls and accessories may be conveniently mounted.

Continuing the description of the core engine 10, air discharged from the compressor 18 (FIG. 3) supports combustion of fuel in the combustor 24. The hot gases generated in the combustor pass to the turbine 26 to provide motive power for the compressor rotor 20. The turbine may comprise two stages of stationary nozzles 72 and blades 74, the latter being mounted on discs 76 connected to the shaft 28 which comprises conical members 28$a$ and 28$b$.

Preferably, the nozzles and blades of the turbine 26 are air cooled, or at least the initial stage thereof. To this end air may be derived from the compressor 18 by means not shown and directed through passageways in the blades and discharged through holes therein to enter the hot gas stream.

The hot gases then follow a gooseneck or divergent annular passageway 78 to enter the fan turbine 14 which comprises a hollow rotor 80 joined to the shaft 16. A plurality of turbine stages are provided by rotor blades 82 and nozzles 84. Hot gases from the fan turbine 14 are then discharged through the primary nozzle 30.

It is, of course, to be understood that those skilled in the art will recognize the need and manner of providing structural support for stationary members and journals for rotating members as well as seals, controls, or the like which are not specifically described herein.

Operating parameters now to be described, preferably in combination with the described structure, are particularly effective in attaining the stated objects of the invention, namely, a significant reduction in specific fuel consumption, light weight, and simple, economical construction.

One of the most important of these operating parameters is the so-called bypass ratio which is the ratio of the mass of air discharged from the fan nozzle 29 to the mass of air directed to the core engine 10 through inlet 22.

By employing a bypass ratio between 5/1 and 10/1 it has been found that substantial reductions in specific fuel consumption, up to 25%, may be obtained over engines of conventional design. A preferred bypass ratio of approximately 8/1 provides outstanding results within this broader range. These values and particularly the preferred ratio of 8/1 are referenced to engine operation in the propulsion of aircraft at a given cruise altitude and speed, which for maximum range capability and economical flight time are respectively 30,000–45,000 feet and Mach .75–.95. In its broader aspects, however, the benefits of the invention are not necessarily limited to such altitudes and speeds.

As previously discussed, it will be understood that a bypass ratio of 8/1 indicates that for every 9 parts of air, 1 part enters the core and 8 parts, 8/9 or approximately 89% is exhausted through the fan nozzle.

To obtain a selected bypass ratio the fan nozzle is properly configured in accordance with known formulae and the core engine is designed to draw the amount of air necessary for such bypass ratio.

Having selected a bypass ratio, it will next be pointed out that the fan rotor tip diameter and compressor rotor tip diameter are a function of rotor hub diameter and blade length and preferably have a ratio generally proportional to:

$$\sqrt{1+B(\Delta P_F \cdot 84)}$$

wherein B=bypass ratio; and
$\Delta P_F$=compression ratio of the fan.

From this proportional relation it will be seen that with high bypass ratio engines the fan diameter is substantially greater than the diameter of compressor 18. This means that acceptable fan rotor tip speeds may be employed while the compressor diameter is minimized to obtain a substantial saving in engine weight. The described fan construction is preferred in that it permits a minimum hub diameter for the fan and thus reduces energy losses as air enters the convergent compressor inlet 22.

It has also been found that for each bypass ratio there is a preferred fan compression or pressure ratio, ranging from approximately 1.70/1 at a bypass ratio of 5/1 to approximately 1.50/1 at a bypass ratio of 10/1. For the preferred bypass ratio of 8/1 the fan compression ratio is approximately 1.55/1. These preferred fan compression ratios are particularly applicable to the described fan and fan nozzle configurations.

The criticality of compression ratio is also applicable to the core engine compressor 18. It has been found that when overall engine compression ratio is above 20/1, significant reductions in specific fuel consumption are obtained, engine compression ratio being the ratio of the compressor (18) discharge pressure to the pressure at the engine inlet, i.e., the shroud inlet 35 for the present engine. The fan 12 pressurizes the air entering the compressor 18 so that to obtain a preferred engine pressure ratio of 26 (for a bypass ratio of 8/1), the pressure ratio of the compressor (18) pressure ratio would be 16.8/1. While engine pressure ratios above 20/1 are preferred it has been found that ratios between 25/1 and 30/1 give optimum results.

It will be noted that air is ducted to the compressor 18 directly from the fan discharge stream. The annular, rounded, downstream edge 101 of the compressor inlet 22 (FIG. 2) functions as a flow divider. When an aircraft is descending with reduced power, the compressor 18 is able to accept substantially less air and the bypass ratio may rise to as much as 25/1. The spaced relation of the flow divider edge 101 from the fan 14 prevents, or at least minimizes any "stall" condition in the fan and likewise prevents or at least minimizes any separation of the air boundary layer along the flow divider surface.

The described variable geometry compressor 18 with provision of means for pivotally adjusting the compressor stator blades 68 enables the use of a single rotor for the compressor 18 to provide a relatively high pressure ratio without danger of stall under transient conditions, such as acceleration and deceleration. This feature further contributes to the overall light weight of the engine and its reliability of operation.

Pressurized air from compressor 18 supports combustion of fuel in the combustor 24 to provide a high energy gas stream. The discharge temperature of this gas stream, usually referred to as turbine (26) inlet temperature, is important. It has been found that by increasing this temperature to 2000° F. and above significant increases in available thrust per pound of engine air flow may be attained with little or no increase in specific fuel consumption when operating with the preferred range of bypass ratios and overall engine compression ratio. This enables the use of a smaller engine for a given thrust level and further minimizes weight and installation drag.

For flight cruise operation, the turbine inlet temperature is preferably approximately 2000° F. At this temperature and with the described use of air cooling means the turbine may be economically formed of available metal alloys having necessary strength capabilities.

FIG. 4 illustrates the combined effects of the above discussed preferred operating parameters with curve $a$ setting forth these effects for the preferred bypass ratio of 8/1. It will be seen that significant reductions in specific fuel consumption are obtained in the incremental steps of increasing engine compression ratio above 20/1 with an optimum range occurring between 25/1 and 30/1.

Operating in this compression range, it will be noted that increases in turbine inlet temperature have little or no effect on specific fuel consumption while giving substantial increases in the thrust available from each pound of air passing through the engine.

This, again, has enabled the use of smaller engines for a given thrust requirement, which engines are consequently lighter and have less aerodynamic drag. These factors are of importance in attaining the stated object of increasing the operating range of aircraft.

Another factor to be noted in connection with the preferred combination of operating parameters is that effective operation of an aircraft is obtained in flight conditions other than cruise. Thus for example, throughout the entire range of bypass ratios from 5/1 (curve $b$) to —10/1 (curve $c$) it is apparent that greater specific thrust can be obtained with a turbine inlet temperature above 2000° F. with little or no increase in specific fuel consumption. Thrust is also a function of turbine (26) inlet temperature to compressor (18) inlet temperature. On a hot day the compressor inlet temperature is substantially greater at takeoff than at cruising altitude. In order to obtain sufficient thrust for takeoff the turbine inlet temperature may be increased by as much as 15–20%. The preferred use of a 2000° F. temperature for cruise operation enables transient operation at higher temperatures while at the same time providing adequate turbine life.

The overall advantages of the specified ranges of operating parameters is further illustrated in FIG. 5 which plots specific fuel consumption against percent of engine thrust being used. Cruise operation is attained at approximately 90% thrust. The reference altitude and speed are 36,000 ft. at Mach .8, with a bypass ratio of 8/1, overall engine compression ratio of 26/1 and turbine inlet temperature of 2000° F.

The significant point in connection with this plot is that, contrary to conventional engines, there is little or no substantial changes in specific fuel consumption over a wide range of thrust utilization. Thus economical operation is attained when the engine is at 40% when an aircraft is lightly loaded at cruise speed or forced to maintain sustained flight at reduced speeds on a holding pattern at an airport.

While there is a significant rise in specific fuel consumption as "idle" speed and minimum thrust are approached, substantial savings are had over conventional engines.

Reverting again to FIGS. 1–3, it will be noted that the diameter of the fan turbine 14 is substantially smaller than the fan (12) tip diameter and, in fact, smaller than the inner fan throat (29) diameter to accommodate to the converging taper of the nacelle 52. The fan turbine is, however, of a maximum diameter within the limitations imposed by the nacelle configuration.

To provide for transition of gases to the larger diameter of the fan turbine 14, the annular combustor 24 is divergently tapered to the turbine 26 which is of an intermediate diameter. This larger diameter of the turbine 26 enables increased efficiency to be derived therefrom. Passageway 78 from turbine 26 to fan turbine 14 is then ogee or gooseneck shaped to bring the hot gases thereto with a minimum of loss.

By properly extracting energy from the hot gases their exit velocity from nozzle 30 is somewhat greater than the exit velocity of air from the fan nozzle 29. This relation has been found to give best engine operation.

While a preferred embodiment has been depicted and described, it will be apparent to those skilled in the art that many variations and modifications may be made thereto without departing from the fundamental theme of the invention.

Having thus described the invention, what is claimed as novel and desired to be secured by Letters Patent of the United States is:

1. An improved method for producing thrust, said method comprising:
    compressing inlet air with a fan,
    exhausting between substantially 83 percent and 91 percent of said fan compressed air through a first nozzle to produce a first thrust component,
    further compressing the remaining portion of said fan compressed air to a pressure at least twenty times the inlet air pressure,
    directing at least a portion of said high pressure air and a fuel into a combustion zone and burning the air-fuel mixture to produce gaseous products of combustion having a temperature at least as great as 2000° F., directing said gaseous products of combustion through a turbine in driving engagement with said fan, and then exhausting said gaseous products of combustion through a second nozzle to produce a second thrust component.

2. The improved method of claim 1 further characterized in that said ambient air is compressed by said fan to a pressure between substantially 1.5 and 1.7 times the inlet air pressure.

3. The improved method of claim 1 further characterized by and including the intermediate step of directing said gaseous products of combustion through a turbine in driving engagement with a compressor prior to directing said gaseous products of combustion through said fan turbine.

4. The improved method of claim 1 further characterized in that approximately 89 percent of said fan compressed air is exhausted through said first nozzle.

5. The improved method of claim 1 further characterized in that the remaining portion of said fan compressed air is compressed to a pressure between substantially 25 and 30 times the inlet pressure.

6. A turbofan engine for efficient thrust production at a cruise altitude and speed, respectively, between 30,000 and 45,000 feet and Mach .75 and .95, said turbofan engine comprising:

a core engine including, in series flow relationship, an axial flow compressor having a rotor, a combustor to which pressurized air from the compressor and fuel are delivered for combustion therein to provide a hot gas stream, a turbine downstream of said combustor adapted to be rotatably driven by said hot gas stream, and a shaft drivingly connecting said compressor rotor and said turbine, a second turbine of larger diameter than said core turbine and rotatable independently of the rotatable elements of the core engine, said second turbine disposed downstream of said core engine turbine and adapted to be rotatably driven by said hot gas stream, a nacelle disposed about said core engine and said second turbine, a generally annular duct having an inlet and an outlet, the upstream end of said nacelle projecting into the outlet of said duct, a fan disposed in said duct for pressurizing airflow through said duct, said fan drivingly connected to said second turbine and including a single row of relatively long blades extending radially into close spaced relationship with said duct, said long blades being substantially larger in diameter than said second turbine, a primary nozzle downstream of said second turbine for discharging said hot gas stream to provide a propulsive thrust, a generally annular inlet to said core engine disposed within said duct downstream of said long fan blades for directing a portion of the air pressurized by said fan to said compressor, said nacelle being divergently tapered to the outlet end of said duct so as to define, in cooperation with said duct, a convergent, generally annular duct nozzle for discharging fan pressurized air and providing a propulsive thrust, the throat of said duct nozzle defined at the outlet end of said duct, with said fan and said second turbine sized to produce a pressure ratio across said fan between 1.7 and 1.5 at said cruise altitude and speed, said compressor and said core turbine sized, in cooperation with said fan, to generate an overall compression ratio, of the pressure of the air discharged from said compressor to the pressure of air entering said duct inlet, of at least 20 to 1 at said cruise altitude and speed, the area of said duct nozzle throat and the area of said core engine inlet being sized, relative to said compressor, so that the ratio of the mass flow rate of air exhausted through said duct nozzle to the mass flow rate of air entering said core engine inlet is between 5 and 10 to 1 at said cruise altitude and speed.

7. The turbofan engine of claim 6 further characterized by and including means, spaced from said nacelle, for dividing said duct into an inner and outer annular flow path, said fan including at least one row of short blades projecting radially across said inner flow path into close spaced relation with said dividing means.

8. The turbofan engine of claim 6 further characterized in that said overall compression ratio is between 25/1 and 30/1.

9. The turbofan engine of claim 6 further characterized in that said mass flow rate ratio is approximately 8/1.

10. The turbofan engine of claim 6 further characterized in that said nacelle is convergently angled inwardly from said duct nozzle throat to its downstream end.

11. The turbofan engine of claim 6 further characterized in that said combustor is divergently tapered in the downstream direction.

References Cited
UNITED STATES PATENTS

| | | | |
|---|---|---|---|
| 2,958,505 | 11/1960 | Frank | 253—39.15 |
| 2,987,873 | 6/1961 | Fox. | |
| 3,060,680 | 10/1962 | Wilde et al. | 60—226 |
| 3,095,166 | 6/1963 | Briggs, Jr. | |
| 3,273,340 | 9/1966 | Hull, Jr. | 60—39.16 |

FOREIGN PATENTS

| | | | |
|---|---|---|---|
| 161,680 | 3/1955 | Australia. | |
| 879,969 | 10/1961 | Great Britain | 230—116 |
| 1,094,635 | 5/1955 | France | 60—226 |

OTHER REFERENCES

The Ducted Fan Jet, SAE Journal, November 1952, p. 26.

SAMUEL FEINBERG, Primary Examiner

U.S. Cl. X.R.

60—226